No. 742,677. PATENTED OCT. 27, 1903.
P. M. KLING.
HOOK AND EYE.
APPLICATION FILED MAY 2, 1903.
NO MODEL.
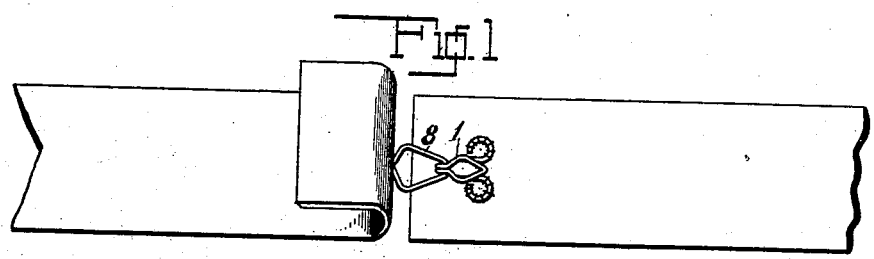
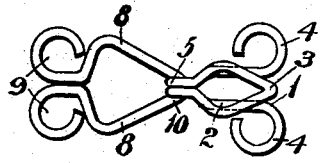 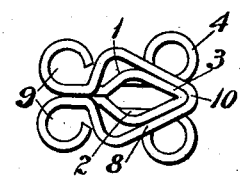
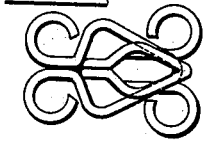 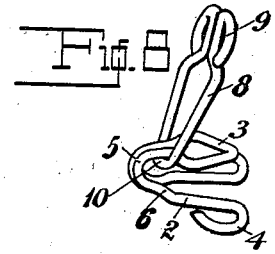
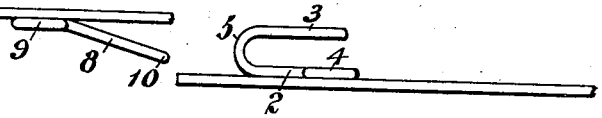
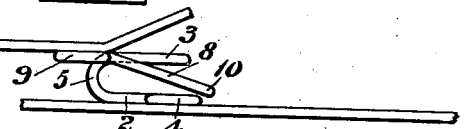
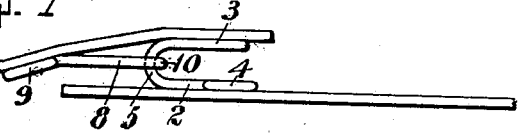
Witnesses
Inventor
Peter M. Kling
By his Attorneys No. 742,677. Patented October 27, 1903.

UNITED STATES PATENT OFFICE.

PETER M. KLING, OF ELIZABETH, NEW JERSEY.

HOOK AND EYE.

SPECIFICATION forming part of Letters Patent No. 742,677, dated October 27, 1903.

Application filed May 2, 1903. Serial No. 155,340. (No model.)

*To all whom it may concern:*

Be it known that I, PETER M. KLING, a citizen of the United States, residing at Elizabeth, in the county of Union and State of New Jersey, have invented certain new and useful Improvements in Hooks and Eyes, of which the following is a specification.

This invention relates to improvements in hooks and eyes of the kind employed as garment-fasteners; and the object of the invention is to construct a hook and eye that can be readily engaged and disengaged and when in engaged position cannot be disengaged accidentally; but at no time is the hook locked with the eye.

Heretofore in the manufacture of hooks and eyes various forms have been devised for interlocking, binding, and otherwise securing the hooks and eyes together. Locking the hooks and eyes together by snapping or forcing one element over the other is undesirable, inasmuch as it is difficult to disengage the parts. In the general construction of hooks and eyes the hook is made the active member in engaging the two elements—that is, it is customary to seize the hook and force the bill through the eye. This ofttimes becomes a very difficult task, owing to the fact that the eye is generally made flat and remains tightly pressed against the garment. When it is attempted with the present eye to make it the active member and force it over the bill of the hook, it is essential to tilt the eye at an angle in order to make it grasp the bill previous to being moved into engaged position.

The present invention discloses an improved form of hook and eye wherein the difficulties above mentioned are obviated and a hook and eye constructed that can be readily and easily manipulated by reason of the eye becoming the active member and having said eye of sufficient proportions to allow it to pass over and under the bill of the hook and into engaged position, as will be hereinafter more specifically described and then pointed out in the annexed claims.

In the accompanying drawings, Figure 1 is a plan view of the hook and eye in engagement as practically applied. Fig. 2 is a plan view on an enlarged scale. Fig. 3 is a plan view showing the eye just after being placed over the hook. Fig. 4 is a similar view after the eye has been further advanced in its engagement with the hook. Fig. 5 is a side elevation showing the two elements disengaged. Fig. 6 is a side elevation showing the eye just after it has engaged the hook. Fig. 7 is a side elevation showing the hook and eye in final engagement. Fig. 8 is a perspective view showing the locking tendency of the eye with the hook.

The hook member 1 consists of a single piece of wire having approximately the configuration herein shown, the essential features of said member being the shank 2, the bill 3, constituting one end of the shank, and the eyelets 4 the other end thereof. The bill of the hook is preferably of hastate or arrow shape. Directly back of the hastate head of the bill the wires converge until they are contiguous to each other and remain so where they form the loop 5, that is engaged by the opposing member. At the conclusion of the loop formation the wires diverge, as shown at 6, and extend practically parallel with the bill, terminating in the usual eyelets for securing the hook to a garment. The eye member 8 is also of hastate or arrow-head formation, the terminals of the wire converging immediately back of the head to form the usual eyelets 9. It will be noticed by referring to the drawings that the engaging end of the eye member is incurvated or bent to assume a different plane from that of the eyelets 9—that is, the eye member will when disengaged from the hook member project at an angle from the goods to which it is secured. This feature of the eye member is one of the essential points of the invention, inasmuch as it enables the manipulator of the two opposing members (the hook and eye) to make the eye the active member and force said eye over the bill of the hook. This operation can be adaptly performed, and the customary annoyance of using the bill of the hook to "find" the ordinary eye, which lies closely against the material to which it is fastened, can be evaded.

Figs. 3 and 6 show the relative positions of the hook and eye when the eye is placed over the bill of the hook and just before the eye retreats to its final position of engagement. When the eye retreats toward its final position of engagement, the point 10 thereof will ride between the two side wires of the shank 2 of the hook and guide the eye, so that it will pass freely over the hastate bill. Fig. 7 shows the final position of engagement wherein the incurvated portion of the eye and the bill and shank of the hook assume a parallelism. If the eye should at any time be moved or disarranged to assume the position shown in Fig. 8, it will be locked against disengagement by reason of the point of the eye engaging the shoulder of the hastate head of the bill and will remain so until the eye is allowed to assume its normal relation with the hook.

Having thus described my invention, the following is what I claim as new therein and desire to secure by Letters Patent:

1. In a hook-and-eye fastening device, a hook member provided with a hastate bill, a loop formed between the hastate bill and the base of the hook, and an eye member of hastate configuration and incurvate to change the relative planes of its hook-engaging portion and its eyelets.

2. In a hook-and-eye fastening device, a hook member, and an eye member, the hook member comprising an eyeleted shank, a hastate bill, a loop formed by the converging of the arms back of the bill, and said arms diverging at the base of the loop to form a guideway for the eye member, and said eye member being of hastated configuration and incurvate to change the relative planes of its hook-engaging portions and its eyelets.

3. In a hook-and-eye fastening device, an eye member of hastate formation and a hook member comprising an eyeleted shank, a hastate bill, a loop formed by the converging of the wires behind the hastate bill and the arms of the shank diverging from the loop to form a guideway for the reception of the engaging end of the eye member.

PETER M. KLING.

Witnesses:
HARRY E. KNIGHT,
J. GREEN.